(12) United States Patent
Patterson et al.

(10) Patent No.: US 6,793,599 B2
(45) Date of Patent: Sep. 21, 2004

(54) POWER TRANSMISSION BELT

(75) Inventors: Phil Patterson, Littleton, CO (US); Doug Sedlacek, Englewood, CO (US); Bobbie E. South, Centennial, CO (US)

(73) Assignee: The Gates Corporation, Denver, CO (US)

( * ) Notice: Subject to any disclaimer, the term of this patent is extended or adjusted under 35 U.S.C. 154(b) by 100 days.

(21) Appl. No.: 10/120,626

(22) Filed: Apr. 10, 2002

(65) Prior Publication Data

US 2002/0183153 A1 Dec. 5, 2002

Related U.S. Application Data

(60) Provisional application No. 60/283,133, filed on Apr. 10, 2001.

(51) Int. Cl.[7] ................................................. F16G 1/00
(52) U.S. Cl. ..................................................... 474/260
(58) Field of Search ................................ 474/237, 260, 474/261, 263, 264, 265

(56) References Cited

U.S. PATENT DOCUMENTS

| | | | |
|---|---|---|---|
| 4,684,569 A | 8/1987 | McGee, Jr. ................ 428/286 |
| 4,747,812 A | 5/1988 | Matsuoka et al. .......... 474/252 |
| 4,892,510 A | 1/1990 | Matsuoka et al. .......... 474/252 |
| 4,937,925 A | 7/1990 | McGee, Jr. .................. 28/112 |
| 5,286,542 A | 2/1994 | Susi et al. .................... 428/58 |
| 5,536,214 A | 7/1996 | Akita et al. ................. 474/268 |
| 5,643,378 A | 7/1997 | White, Jr. et al. ............ 156/87 |
| 5,741,197 A | 4/1998 | Akita et al. ................. 474/268 |
| 5,904,630 A | * 5/1999 | Berthelier ................... 474/263 |
| 5,971,879 A | * 10/1999 | Westhoff ..................... 474/260 |
| 6,210,620 B1 | 4/2001 | Wilke ......................... 264/257 |
| 6,491,598 B1 | * 12/2002 | Rosenboom ................ 474/260 |
| 2002/0132692 A1 | * 9/2002 | Knutson ...................... 474/263 |
| 2003/0017900 A1 | * 1/2003 | Kopang ....................... 474/260 |
| 2003/0073533 A1 | * 4/2003 | Knutson ...................... 474/263 |
| 2003/0139242 A1 | * 7/2003 | Teves et al. ................. 474/263 |

FOREIGN PATENT DOCUMENTS

| | | | |
|---|---|---|---|
| EP | 0 481 652 A2 | 4/1992 | ............ F16G/5/06 |
| EP | 0 774 597 A1 | 5/1997 | ............ F16G/5/20 |
| JP | 57149646 | 9/1982 | ............ F16G/5/06 |
| JP | 58170946 | 10/1983 | ............ F16G/1/28 |
| JP | 57187136 | 10/1984 | ............ F16G/5/06 |

* cited by examiner

Primary Examiner—Thomas R. Hannon
(74) Attorney, Agent, or Firm—J. A. Thurnau, Esq.; C. H. Castleman, Esq.; S. G. Austin, Esq.

(57) ABSTRACT

A belt having a non-woven region on a pulley engaging surface. The non-woven region has a random coverage to reduce natural frequency harmonics, control frictional characteristics, permeation and thermal resistance. The non-woven may comprise a combination of softwood and hardwood pulp, or synthetic materials applied in a random matrix to a body having a fiber loading.

22 Claims, 2 Drawing Sheets

POWER TRANSMISSION BELT

REFERENCE TO RELATED APPLICATIONS

This application claims priority from U.S. provisional patent application Ser. No. 60/283,133 filed Apr. 10, 2001.

FIELD OF THE INVENTION

The invention relates to power transmission belts having an engineered surface and more particularly, to power transmission belts having an engineered surface comprising a region having a non-woven material and a fiber loaded compression layer.

BACKGROUND OF THE INVENTION

It is known in the art to make power transmission belts from elastomeric materials having an embedded tensile member. The belts may describe a multi-rib, toothed or v type profile. The belts run in pulleys having a matching profile.

It is known that the rib flank surfaces of V and multi-v rib belts are subject to sliding wear, temperature extremes, normal and frictional forces that cause belt noise, rib surface sloughing, slipping, and chatter. It is also known that power transmission capacity and belt longevity are functions of several factors, including the type of material contacting the pulley surfaces. These are currently addressed by incorporating a high loading of various fibers into the mix of the undercord materials. These fibers, or portions of them, are exposed when the V profile is cut or ground to form the belt from the cured belt slab. The resulting surface is a combination of the base polymer and exposed fibers. This technique is limited with regard to an engineering approach for composite design, and/or controlling friction, noise, and slippage. It also creates a stiff structure that resists bending, which can contribute to belt rib cracking and shortened belt life.

Representative of the art is U.S. Pat. No. 4,892,510 (1990) to Matsuoka which discloses a v-ribbed belt having a surface layer comprising a non-woven fabric at the outer surface vulcanized to ribs solely made of rubber.

Also representative of the art is U.S. Pat. No. 5,536,214 (1996) to Akita et al. which discloses a power transmission belt having non-woven fabric on the inside of the belt body on a plurality of the grooves.

Also representative of the art is U.S. Pat. No. 4,956,036 (1990) to Sedlacek which discloses a discontinuous fiber loaded compressive layer in a multi-ribbed belt. The belt is ground to create the required rib profile, thereby exposing the fibers. The elastomeric body portion is loaded with fiber preferably from about 0.5 to 20% by volume, with preferred loading at 3% by volume.

What is needed is a power transmission belt having a non-woven pulley engaging surface and fiber loaded compressive layer. What is needed is a power transmission belt having a non-woven pulley engaging surface and fiber loaded compressive layer and a multi-ribbed profile. The present invention meets these needs.

SUMMARY OF THE INVENTION

The primary aspect of the invention is to provide a power transmission belt having a non-woven pulley engaging surface and fiber loaded compressive layer.

Another aspect of the invention is to provide a power transmission belt having a non-woven pulley engaging surface and fiber loaded compressive layer and a multi-ribbed profile.

Other aspects of the invention will be pointed out or made obvious by the following description of the invention and the accompanying drawings.

The invention comprises a belt having a region comprising a non-woven material on a pulley engaging surface. The non-woven region has a random coverage of the non-woven material to reduce natural frequency harmonics, control frictional characteristics, permeation and thermal resistance. The non-woven may comprise a combination of softwood and hardwood pulp, as well as synthetic fibers applied in a random matrix to a body having a fiber loading.

DETAILED DESCRIPTION OF THE PREFERRED EMBODIMENT

Figure 1:
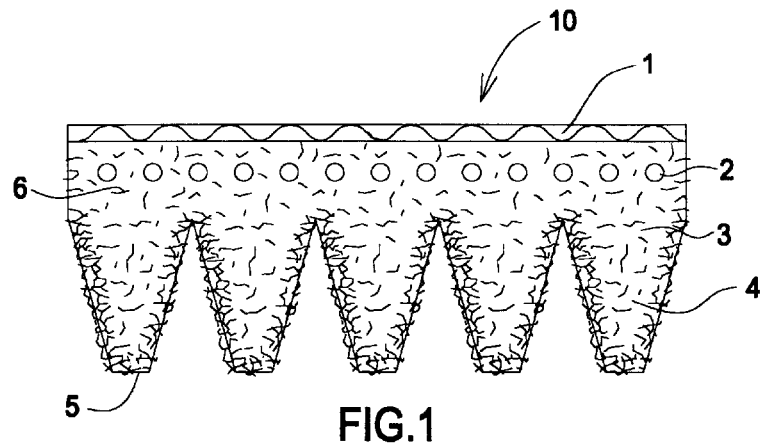
FIG. 1 is a side cross-sectional view of the inventive belt.

FIG. 1 is a cross-sectional view of the inventive belt 10. Belt 10 comprises body 3 and pulley engaging ribs 4 running in a longitudinal direction. Belt 10 also comprises load carrying tensile members 2 that run parallel to a longitudinal axis of the belt. Ribs 4 further comprise fibers 6 infused throughout the elastomeric material. Belt 10 may also comprise a jacket 1 applied to an overcord surface.

Ribs 4 may comprise any number and any profile required by a user. FIG. 1 depicts a multi-ribbed profile. The belt may also comprise a single rib v-belt profile.

Pulley engaging non-woven region 5 is a random array of non-woven material co-mingled into the elastomeric of the body 3 and ribs 4 forming a matrix. Region 5 does not have a discrete boundary between the non-woven containing area and the body 3. Due to the co-mingling, both non-woven material and elastomeric are present at a pulley engaging surface.

Non-woven region 5 may comprise a single region or a plurality of overlaid regions of non-woven material. Further, the non-woven region does not have the characteristic of uniformly spaced and aligned fibers as in a cloth or textile. Since the fibers comprising the non-woven region are randomly oriented within the matrix, this reduces the creation and support of natural frequency harmonics one would expect in a more homogeneous material, i.e., where the fibers are more oriented. These harmonics comprise audio oscillation (noise) as well as low frequency oscillations of the belt vibrating between pulleys. A randomly oriented non-woven region tends to substantially damp these oscillations.

Non-woven materials may also be chosen to give a required A frictional characteristic, permeation and thermal resistance. A friction reducing agent can be used in the non-woven region to control the coefficient of friction of the outer surface of the non-woven region. The friction reducing agent may be part of the rubber that permeates the non-woven region or is applied to the non-woven material before assembly of the belt. By way of example and not of limitation, friction reducing agents may include waxes, oils, graphite, molybdenum disulfide, PTFE, mica talc, and various blends of the above.

The non-woven material is cellulose based and has a basis weight in the range of 10 lbs./3K sq.ft. up to 45 lbs./3K sq.ft. The porosity of the non-woven material is in the range of 100 to 370 CFM per ft.$^2$ per ½" $H_2O$ $\Delta P$. The thickness of the non-woven region 5 is in the range of 0.025 mm to 3 mm.

The tensile strength in the machine direction is in the range of 230 to 1015 g/inch. The tensile strength in the cross direction is in the range of 66 to 250 g/inch.

The preferred embodiment uses a basis weight of 10 lbs./3K sq.ft.; porosity of 100 CFM per ft.$^2$ per ½" H$_2$O ΔP; tensile strength in the machine direction 550 g/inch; tensile strength in the cross direction 250 g/inch. The non-woven comprises 50% softwood and 50% hardwood.

Fibers 6 are included in the matrix of the elastomeric body 3 separate from the non-woven region 5. Fibers 6 decrease rib surface sloughing and chatter. The fibers may include aramid, Kevlar, carbon, polyester, polyethylene, fiber glass, nylon. Other organic fibers may include wool, hemp, cotton, etc. The amount of fibers used in the rib elastomeric may be in the range of 0.01 to 20 parts fiber per hundred parts of rubber. The preferred embodiment utilizes 0.01 to 5 parts fiber per hundred parts of rubber. The embodiments allow a dramatic reduction in the percentage of flock or fiber loading required in the undercord rib materials. This change has resulted in improved belt performance due to enhanced resilience and bending of the undercord constructions.

The embodiment described herein has been found to reduce/eliminate noise, reduce the instance of rib surface sloughing (or weight loss), while providing excellent tractive effort forces and enhanced V wedging.

Method of Manufacture

The inventive belt is built up on a mandrel in a series of layers. The elastomeric or fabric overcord of the belt is laid-up first. Each succeeding elastomeric layer is laid upon the previously applied layer. A gum layer may also be applied. The tensile cords are applied with the elastomeric layers. The elastomeric undercord is then applied. The final element applied to the build upon the final undercord layer is the non-woven region.

At this stage of fabrication, the non-woven region may comprise one or more layers of non-woven material. The non-woven layer or layers have the added advantage of allowing gases developed during the curing process to vent or escape from the edges of the mold. Venting of gases from the mold facilitates impregnation of the elastomeric material into the non-woven material, forming region 5.

The complete build is then subjected to curing pressures and temperatures sufficient to vulcanize and form the belt. For example the fabrication process may comprise;

Once the belt is laid up on a mandrel the slab is removed and placed in the mold;

1) evacuating the air from inside the mold and holding for 1 to 5 minutes;
2) increasing the steam pressure on the outside shell to a range of 175 to 235 psig;
3) after 2 to 10 minutes, increasing the steam pressure on the inside of the mold to a range of 85 to 210 psig;
4) curing for 10 to 20 minutes;
5) decreasing the steam pressure inside the mold to atmospheric pressure;
6) decreasing the steam pressure outside the mold to atmospheric pressure;
7) quenching the mandrel in a cool fluid, such as water;
8) removing the cured belt blank from the mandrel.

Once cooled, the cured belt build is then separated from the mandrel and cut to the appropriate belt widths.

The optimum rib shapes are achieved with process pressures on the high end of the range.

Hydraulics or other methods known in the art (pneumatic, electrical) can also be used to apply pressure to the belt, in conjunction with concurrently applied electric heat for curing in lieu of steam cure. The pressure range for a hydraulic cure is 85 to 500 psig. The temperature range is 250 to 500° F. This method of curing broadens the choice of rubber stocks.

Application of pressure prior to curing forces the elastomeric into the non-woven material. The elastomeric material then occupies the interstices between the individual fibers comprising the non-woven material. This results in a region of non-woven material wherein the non-woven materials are co-mingled with the elastomeric.

Tests

Noise and weight loss tests were conducted to compare the inventive belt with belts without a non-woven pulley contact surface. The results indicated the weight loss and noise generated by the belts with a non-woven imbedded surface was reduced significantly.

The test belts were as follows:

Belt 1: EPDM—Overcord, Cord, Undercord stock having 12 parts cotton fibers, nonwoven construction.

Belt 2: EPDM—Overcord, Undercord stock having 4 parts nylon fibers, nonwoven construction.

Belt 3: CR—Overcord, Cord, Undercord stock with 18 to 20 parts cotton fibers, nonwoven construction.

Belt 4: CR—Overcord with tubular knit, cord, undercord stock with 18 to 20 parts cotton fibers, nonwoven construction.

Comparison belt A: Std. Chloroprene rubber belt with cut or ground rib profiles, same cord and overcord.

Comparison belt B: Std EPDM belt with cut or ground rib profiles, same cord and overcord.

Figure 2:
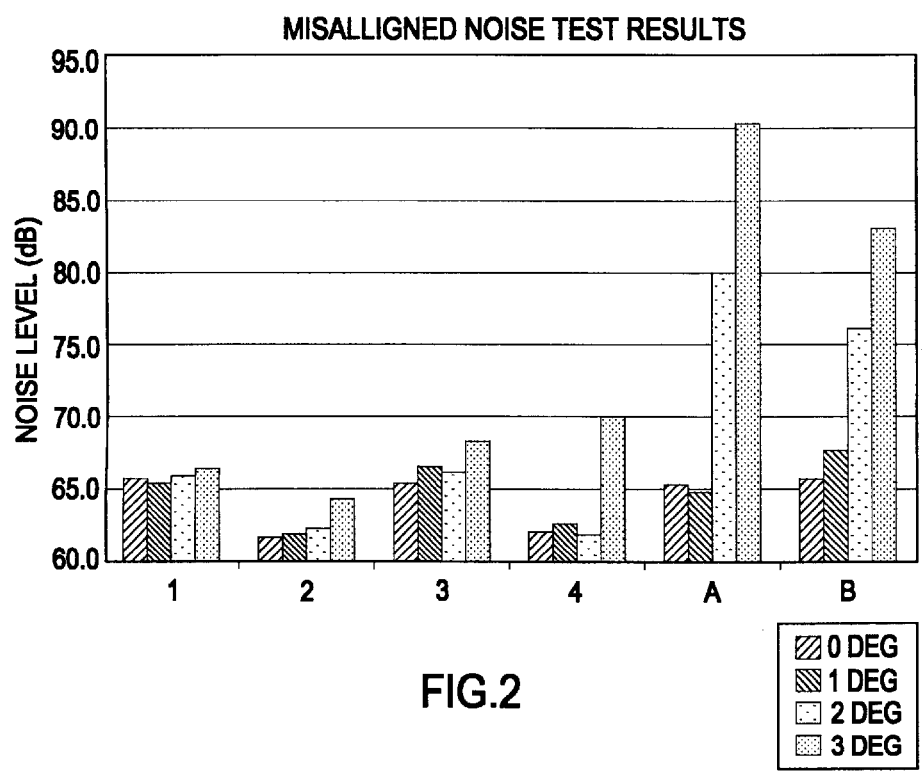
FIG. 2 is a graph of the misaligned noise test results.

In the misalignment noise test, the non-woven layer belts exhibited a noise reduction in the range of 13 dB to 19 dB for 3 degrees of misalignment as compared to a belt without a non-woven pulley contact surface. The inventive belts exhibited noise generation equivalent to that of standard belts with 1 degree of misalignment. The misalignment noise test is conducted on a two point drive using 140 mm OD pulleys. A horizontal tension of approximately 90 KgF is applied to the test belt. The pulleys are offset from each other and the noise is measured. Test results are shown in FIG. 2.

Figure 3:
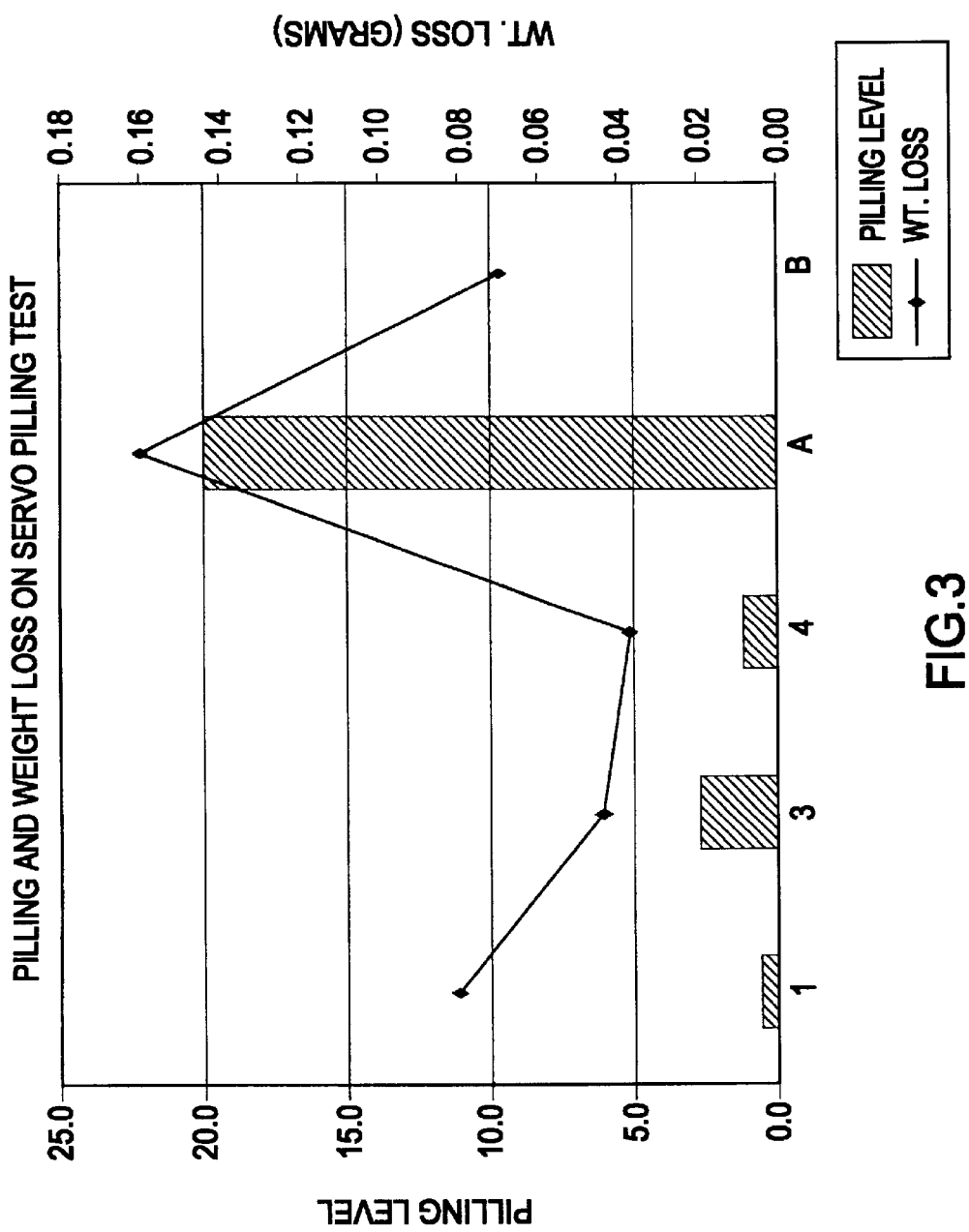
FIG. 3 is a graph of the weight loss results.

The weight loss tests demonstrated the inventive belts experienced 87.5% less weight loss as compared to a standard belt for identical operating conditions. Test results are shown in FIG. 3.

The test data confirmed that orientation of the non-woven substrate is not critical to the results. Both mill and 90° orientations were tested giving similar results as described above.

The comparative tests were run using the same tensile cord and overcord materials, only the undercord compound and surfaces were enhanced with non-woven materials in the inventive belts.

The data indicates that several non-woven combinations were effective. These range from a formation of 100% softwood, a hardwood/softwood blend, a softwood/synthetic blend, and a 100% hardwood.

Example ratios are as follows:

|   | Softwood | Hardwood | Soft/Syn. |
|---|---|---|---|
| A | 100% | 0% | 0% |
| B | 50% | 50% | 0% |
| C | 75% | 25% | 0% |
| D | 70% | 0% | 30% |
| E | 85% | 0% | 15% |
| F | 0% | 100% | 0% |

The foregoing ratios are offered as illustrative of a range of ratios and are not offered by way of limitation. The preferred embodiment utilizes ratio option B.

The synthetic fibers include aramid, Kevlar, carbon, polyester, polyethylene, fiber glass, nylon. Other organic fibers used with the softwoods may include wool, hemp, cotton, etc. These would be included as coefficient of friction and/or structural modifiers. The all hardwood composition may be accomplished using a wood flour or highly processed pulp, blended and mixed into the undercord elastomeric compounds.

Although a single form of the invention has been described herein, it will be obvious to those skilled in the art that variations may be made in the construction and relation of parts without departing from the spirit and scope of the invention described herein.

We claim:

1. A belt comprising:
   a body comprising an elastomeric material and having tensile members running in a longitudinal direction;
   the body having a pulley engaging region having a profile, the pulley engaging region comprising a non-woven material co-mingled with the elastomeric material; and the elastomeric material further comprises a fiber loading.

2. The belt as in claim 1, wherein the pulley engaging region comprises a thickness of 0.025 mm to 3.0 mm.

3. The belt as in claim 2, wherein the non-woven material comprises a combination of softwood pulp and hardwood pulp.

4. The belt as in claim 3, wherein the softwood pulp comprises from greater than 0% to approximately 50% of the non-woven material.

5. The belt as in claim 4, wherein the softwood pulp comprises one of cotton, wool or hemp or a combination of two or more of the foregoing.

6. The belt as in claim 4, wherein the softwood pulp comprises from approximately 50% to 100% of the non-woven material.

7. The belt as in claim 2, wherein the non-woven material comprises a combination of softwood pulp and synthetic material.

8. The belt as in claim 7, wherein the synthetic material comprises one of nylon, fiberglass, polyethylene, polyester, carbon, Kevlar, or aramid or a combination of two or more of the foregoing.

9. The belt as in claim 8 wherein the synthetic material comprises from greater than 0% to approximately 50% of the non-woven material.

10. The belt as in claim 2, wherein the non-woven material comprises a blend of synthetic and organic materials.

11. The belt as in claim 10, wherein the organic materials comprise softwood pulp and hardwood pulp.

12. The belt as in claim 1, wherein the fiber loading is in the range of 0.01 to 5 parts per hundred rubber.

13. The belt as in claim 12, wherein the non-woven region comprises at least two layers of non-woven material.

14. The belt as in claim 12, wherein the region comprises a multi-ribbed profile.

15. The belt as in claim 12, wherein the region comprises a v-belt profile.

16. The belt as in claim 12, wherein fiber loading fibers are selected from the group comprising aramid, Kevlar, carbon, polyester, polyethylene, fiber glass and nylon or two or more of the foregoing.

17. The belt as in claim 1, wherein the pulley engaging region comprises a friction reducing agent.

18. The belt as in claim 17, wherein the friction reducing agent is selected from the group comprising waxes, oils, graphite, molybdenum disulfite, PTFE, mica talc, or two or more of the foregoing.

19. The belt as in claim 1, wherein the non-woven material comprises softwood pulp.

20. The belt as in claim 1, wherein the non-woven material comprises hardwood pulp.

21. The belt as in claim 20, wherein the hardwood pulp comprises wood flour.

22. The belt as in claim 21, wherein the wood flour is mixed into the elastomeric material.

* * * * *